United States Patent
Braswell et al.

(10) Patent No.: US 7,957,851 B2
(45) Date of Patent: Jun. 7, 2011

(54) SYSTEM AND METHOD FOR UTILIZATION OF TRANSMITTED DIGITAL FLIGHT DATA ACQUISITION INFORMATION TO ACCOMPLISH VIBRATION BALANCE SOLUTIONS

(75) Inventors: James L. Braswell, Saginaw, TX (US); Daniel Craycraft, Fort Worth, TX (US)

(73) Assignee: American Airlines, Inc., Fort Worth, TX (US)

( * ) Notice: Subject to any disclaimer, the term of this patent is extended or adjusted under 35 U.S.C. 154(b) by 1716 days.

(21) Appl. No.: 11/124,759

(22) Filed: May 9, 2005

(65) Prior Publication Data
US 2006/0251507 A1 Nov. 9, 2006

(51) Int. Cl.
*G06F 17/00* (2006.01)
(52) U.S. Cl. .............. 701/3; 701/33; 700/279; 700/280; 700/66; 706/23; 416/219 R
(58) Field of Classification Search .................... 701/29, 701/33, 3; 416/144, 145, 219 R, 216 R; 73/457, 73/462; 700/279, 280, 66; 706/23; 244/1 N
See application file for complete search history.

(56) References Cited

U.S. PATENT DOCUMENTS

| | | | | |
|---|---|---|---|---|
| 5,011,374 A | * | 4/1991 | Miller | 416/144 |
| 5,219,454 A | * | 6/1993 | Class | 416/145 |
| 5,277,063 A | * | 1/1994 | Thomas | 73/457 |
| 5,586,065 A | * | 12/1996 | Travis | 702/191 |
| 6,027,239 A | * | 2/2000 | Ghassaei | 700/279 |
| 6,250,149 B1 | * | 6/2001 | Black | 73/178 R |
| 7,321,809 B2 | * | 1/2008 | Vian et al. | 700/279 |
| 2006/0188374 A1 | * | 8/2006 | Mickol et al. | 416/219 R |

OTHER PUBLICATIONS

The PBS-4100R Series II Vibration and Balancing System MTI Instruments, Inc.
PBS-4100 solves tough balancing problems.
PBS-4100 Portable Balancing System Fast, accurate balancing.

* cited by examiner

*Primary Examiner* — Ronnie Mancho
(74) *Attorney, Agent, or Firm* — Winstead PC

(57) ABSTRACT

A system and method is provided for monitoring, collecting, storing, transmitting, calculating and uploading to a secure web server real-time balancing solutions for at least the N1 Low Pressure Compressor portion of a jet engine. The method comprises collecting a series of engine vibration data strings and transmitting a data string set to a ground stations for conditioning, formatting and forwarding to a source for calculating and providing fan balance solutions to a secure server wherein the data strings comprise at least phase angle of imbalance data, N1 RPM and the magnitude of the N1 vibration. The balance solution determined comprises the required weight (mass) and location of weight (mass) installation necessary to correct a fan imbalance in a turbine engine.

21 Claims, 6 Drawing Sheets

SYSTEM AND METHOD FOR UTILIZATION OF TRANSMITTED DIGITAL FLIGHT DATA ACQUISITION INFORMATION TO ACCOMPLISH VIBRATION BALANCE SOLUTIONS

CROSS-REFERENCE TO RELATED APPLICATION

This application is not related to any pending application.

FIELD OF INVENTION

The present invention relates to vibration balancing of engines. Particularly the present invention relates to a system and method for monitoring, collecting and transmitting vibration data related to aircraft engines. More particularly, this invention relates to a system and method for monitoring, collecting, transmitting and utilizing monitored engine vibration data information stored in a digital flight data recorder for accomplishing vibration balance solutions for each engine of an aircraft and utilizing the solutions for real-time N1 fan balancing maintenance and other analysis.

BACKGROUND OF INVENTION

Most standard jet engines are made up of at least an air intake, a series of compressors, a combustion chamber, a series of fans and/or turbines and an exhaust nozzle. In a typical jet engine, air comes into the front of the engine and is compressed by the compressors. The air then passes into a combustion chamber where fuel is added and ignited. This expanding air is then used to drive a series of turbines. These turbines are connected to compressors by shafts and hence drive them. The air then travels out of the back of the engine to provide thrust. A turbine consists of a number of blades placed around a shaft. There are two essential types, fans and compressors. In a fan the blades are quite long and slender while in a compressor they are short and compact.

Most all jet engines and the like are prone to vibration from the rotating fan and compressor parts. The vibration arises because often the center of mass of each disc rotating assembly may be slightly displaced from the center of rotation. Moreover, the shaft may also suffer from slight misalignment and center of mass offsets too. Thus, when the engine rotates, these imbalances cause the individual components to vibrate. Differences between the levels of vibration of each part may aggravate the resulting movement of the engine etc. The vibration is typically transmitted through the aircraft structure generating corresponding noise and vibration in fuselage and cabin of the aircraft. Many times such vibrations and noises often cause passenger and crew discomfort. A need exists to delete such vibrations, especially in flight, and transmit this information for calculating and determining real time balancing solutions to minimize the vibration and noise relating to the engine and vibrations detected within the aircraft cabin caused by such engine vibrations.

Many commercial airline carriers and other aviation related industries frequently monitor the structural health, integrity and status of their aircraft and more specifically the life blood of the aircraft—its engines. Such structural health and status information is frequently utilized to determine the current performance of an engine in addition to determining if engine maintenance is required. There are presently many systems that monitor aircraft and aircraft engine performance and health factors.

However, there exist no systems and methods for measuring, monitoring, storing, and transmitting data containing vibration and balance information that exist or occur during flight especially those relating to the N1 low pressure fans of a jet engine. Present systems require the aircraft to be on the ground and on open tarmac to perform adequate engine runs utilizing externally attached monitoring equipment to determine and analyze vibration and balancing problems of a jet engine. Many times, the engine must be fully dismounted from the aircraft wing and installed in an engine test cell facility to adequately analyze such problems.

There are currently three methods to collect data for balancing fan systems on modern jet aircraft such as the Boeing 757. One such method uses externally mounted instrumentation to collect the necessary vibration data for calculating a balance solution. An example of such externally mounted instrumentation is that found in the PBS4000 and PBS4100 series vibration and balancing systems manufactured by MTI Instruments, Inc. of Albany, N.Y.

A second method utilizes the internal solution capability of certain aircraft vibration monitoring units. However, many times this option tends to dramatically increase cost factors to modify current airline fleets to integrate this system with in place equipment. However, many carriers still opt to make use of such vibration detection and monitoring units.

A third method for such "on the ground" engine test runs, and one of the primary methods for accomplishing a fan system balance solution, is achieved utilizing what is known to those skilled in the art as the "3-shot plot" method and is described in further detail hereinbelow.

The balancing of fans is a regular maintenance operation for the airlines. Typically an engine will be dismantled and tested for defects, and any faulty blades replaced by new ones. The turbine then needs to be reassembled and balanced, an operation complicated by differences in blade weights. The overall balancing can be a time consuming task, particularly for those engines where the fan must be dismantled and reassembled whenever blades are interchanged. The fan balancing is a major part of the maintenance operation. When maintenance is carried out on fans or 'spools' (banks of blades on a shaft) they must be dynamically balanced by the addition of small correction weights before being reassembled into their modules. This dynamic balancing requires that the spools be loaded into a test bed which then spins the spools up to normal running speed. External equipment with special sensors are used to register any imbalance or vibration. From the vibration patterns, it is possible to calculate the location of the mass center and to indicate where correction weights should be placed. Once the engine has been fully reassembled it too must be dynamically balanced. If such an imbalance is found, it is generally solved by rotating the modules with reference to each other. This allows the individual imbalance forces to be aligned to reduce the overall imbalance. The blades on an individual turbine are all slightly different in weight due to manufacturing variation. As a consequence, different orders of placement of the blades around the turbine will give rise to different mass centers. The determination of a correct ordering of blades is an important engineering problem for a number of reasons. First, there is a limit on the number of correction weights that can be used in the subsequent dynamical balancing of the fan.

In addition, imbalance of rotors, such as large compressor fans of jet engines, can occur when part, or whole, of a fan blade becomes detached from the fan disc while the engine is running. When a blade is lost the rotor experiences a large out-of-balance load which causes the rotor to orbit bodily about its original axis of rotation. Because of manufacturing inaccuracies, variations occur in the weights of the blades that can, in turn, lead to significant out-of-balance forces on the engine. The overall time and cost required for balancing can be significantly decreased if the best balancing solution can be determined by integrity sensors and equipment already available on many aircraft, but in addition being able to transmit via communication links and equipment to ground receivers that calculate balance solutions for use by maintenance upon landing.

As such, many jet engine original equipment manufacturers (OEMs), jet engine service providers and commercial aviation companies have desired a system and method to monitor, record, transmit and calculate fan system balance solutions of an aircraft engine in real-time and be able to make such solutions available to an awaiting mechanic. Many current systems found on modern commercial aircraft monitor various aircraft and engine status and performance. Such status and performance data are frequently recorded and transmitted via an Aircraft Communications Addressing and Reporting System (ACARS) using a communication data link. Many times such data relating to the aircraft engine result in limited engine analysis because only certain parameters of the engine performance had been monitored, stored, transmitted and used and the data never given a complete picture or historical indication of engine vibration and balance performance in-flight.

Current systems and methods of recording performance of an aircraft engines use a ground data link unit that interfaces with numerous components of the aircraft. Modern aircraft currently operated by the commercial airline industry employ airborne data acquisition equipment, such as a digital flight data acquisition unit (DFDAU) as a non-limiting example, which monitor signals supplied from a variety of transducers distributed throughout the aircraft, and provide digital data representative of the aircraft's flight performance based upon such transducer inputs. As flight performance data is obtained by the DFDAU equipment, it is stored in an attendant, physically robust, digital flight data recorder (DFDR—commonly known as the aircraft's "black box"), so that in the unlikely event of an in-flight mishap, the DFDR can be removed and the stored flight performance data analyzed to determine the cause of the mishap.

However, there exists a need for a system and method that utilizes the aircraft's onboard acquisition equipment and sensors, without significant modification, to monitor, collect, record, and transmit certain flight phase results of data variables and parameters of engine vibration information specifically relating to N1 compressor stage fan vibrations during flight and on the ground via at least radio waves to ground stations for processing and calculation of real-time fan balance solutions.

In addition, there exists a need for making readily available such N1 stage real-time fan balance solutions to industry know-how so as to be readily prepared to repair any known imbalances discovered during flight or on ground test runs but while utilizing minimum manpower, time, and fuel as compared to current methods.

SUMMARY OF INVENTION

To the accomplishment of the foregoing and related ends, the invention comprises the features hereinafter fully described and particularly pointed out in the claims. The following description and the annexed drawings set forth in detail certain illustrative embodiments of the invention. These embodiments are indicative of but a few of the various ways in which the principles of the invention may be employed. Other objects, advantages and novel features of the invention will become apparent from the following detailed description of the invention when considered in conjunction with the drawings.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore among the objectives of this invention to provide a system and method for facilitating the accomplishment of at least jet engine fan system balancing solutions utilizing minimum manpower without the requirement of numerous ground engine runs which inherently increase manpower requirements, aircraft down time and fuel costs all utilizing standard equipment found in most modern jet aircraft, such as the Boeing 757, without the need to attach external monitoring, collecting and recording equipment.

In accordance with the present invention a system and method is provided for monitoring, collecting, storing, transmitting and calculating real-time balancing solutions for at least the N1 Low Pressure Compressor portion of a jet engine. The method comprises collecting a series of engine vibration data strings and transmitting a data string set to ground stations for conditioning, formatting and forwarding to a source for calculating and providing fan balance solutions to a secure server wherein the data strings comprise phase angle of imbalance data, N1 RPM and the magnitude of the N1 vibration. The balance solution determined comprises the required weight (mass) and location of weight (mass) installation necessary to correct the fan imbalance.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

It should be understood that any one of the features of the invention may be used separately or in combination with other features. It should be understood that features which have not been mentioned herein may be used in combination with one or more of the features mentioned herein. Other systems, methods, features, and advantages of the present invention will be or become apparent to one with skill in the art upon examination of the drawings and detailed description. It is intended that all such additional systems, methods, features, and advantages be included within this description, be within the scope of the present invention, and be protected by the accompanying claims.

These and other objects, features and advantages of the present invention will be more readily apparent when considered in connection with the following, detailed description of preferred embodiments of the invention, which description is presented in conjunction with annexed drawings below.

BRIEF DESCRIPTION OF DRAWINGS

The foregoing summary as well as the following detailed description of the preferred embodiment of the invention will be better understood when read in conjunction with the appended drawings. It should be understood, however, that the invention is not limited to the precise arrangements and instrumentalities shown herein. The components in the drawings are not necessarily to scale, emphasis instead being placed upon clearly illustrating the principles of the present invention. Moreover, in the drawings, like reference numerals designate corresponding parts throughout the several views.

The invention may take physical form in certain parts and arrangement of parts. For a more complete understanding of the present invention, and the advantages thereof, reference is now made to the following descriptions taken in conjunction with the accompanying drawings, in which.

DETAILED DESCRIPTION OF THE INVENTION

The following discussion is presented to enable a person skilled in the art to make and use the invention. The general principles described herein may be applied to embodiments and applications other than those detailed below without departing from the spirit and scope of the present invention as defined by the appended claims. The present invention is not intended to be limited to the embodiments shown, but is to be accorded the widest scope consistent with the principles and features disclosed herein.

To assist in a more complete understanding of the novelty and advantages provided by the present invention's system and method, the most frequently used and current method in the industry for accomplishing a jet engine fan system balance solution is first described below followed thereafter by the description of the system and method according to the present invention. The prior art method described below and the novel system and method according to the present invention are both described herein as relating to use with the Rolls-Royce RB211-535E4B engine on the Boeing 757 commercial airliner. However, it should be understood that the description of the present invention hereinbelow as it relates to the RB211-535E4B engine on the Boeing 757 and must not be construed as limiting in scope of use. Specifically, it should be understood by one skilled in the art the system and method taught by the present invention may be utilized and implemented without limitation the specific aircraft and engine as disclosed.

Figure 1A:
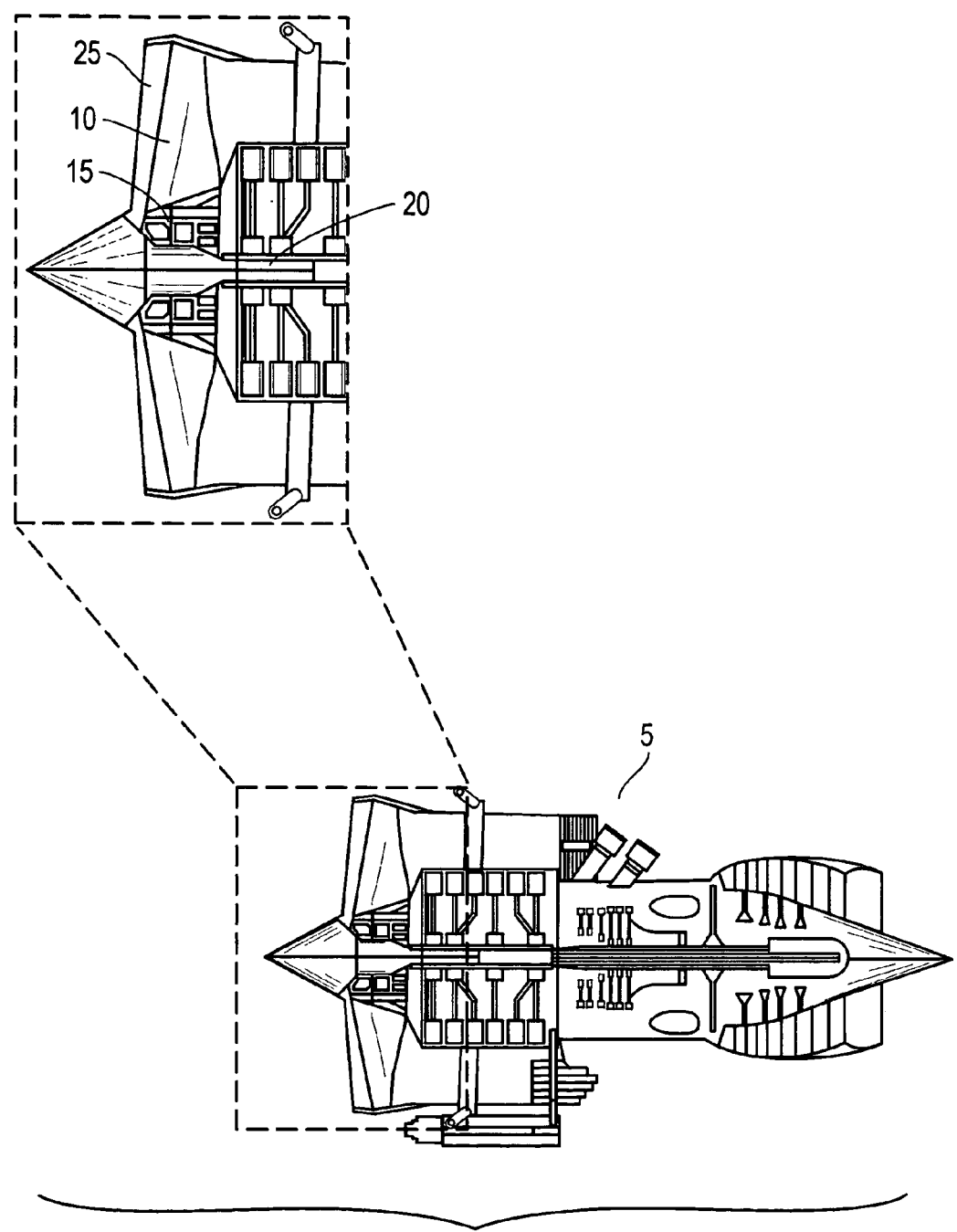
FIG. 1A depicts a cut-away profile view of a Rolls-Royce RB211-535 engine and further depicts an enlarged view of the N1 low pressure section components as utilized by the present invention.

Although commonly used, the 3-shot plot method is a time cost and labor intensive "on the ground" method for accomplishing a fan system balance solution. It is conducted by accomplishing multiple (at least 5) engine runs to collect necessary engine vibration data and calculate the balance solution manually. The '3-shot plot' is the method currently used by many carriers and various engines such as American Airlines for use with the Rolls-Royce RB211-535E4B engine 5 shown in FIG. 1A.

Of primary importance before describing the "3-shot plot" method and the system and the novel method of the present invention, a brief description of a few key components of the engine 5 is necessary for a more complete understanding of the discussion herein. As shown in a profile view in FIG. 1A, the engine 5 is comprised of a plurality of fan rotors 10 (sometimes referred to herein as fan blades) that are integrally disposed thereon a fan disc 15. The fan disc 15 circumferentially encompasses a portion of the engine's N1 fan shaft 20, whereon upon rotation caused by the normal operation of air through the inlet 25 of the engine 5 the fan shaft 20 rotates causing the fan disc 15 to rotate (due to component attachment as described below) and as a direct result the fan rotors/blades 10 rotate in unison therewith.

Figure 1B:
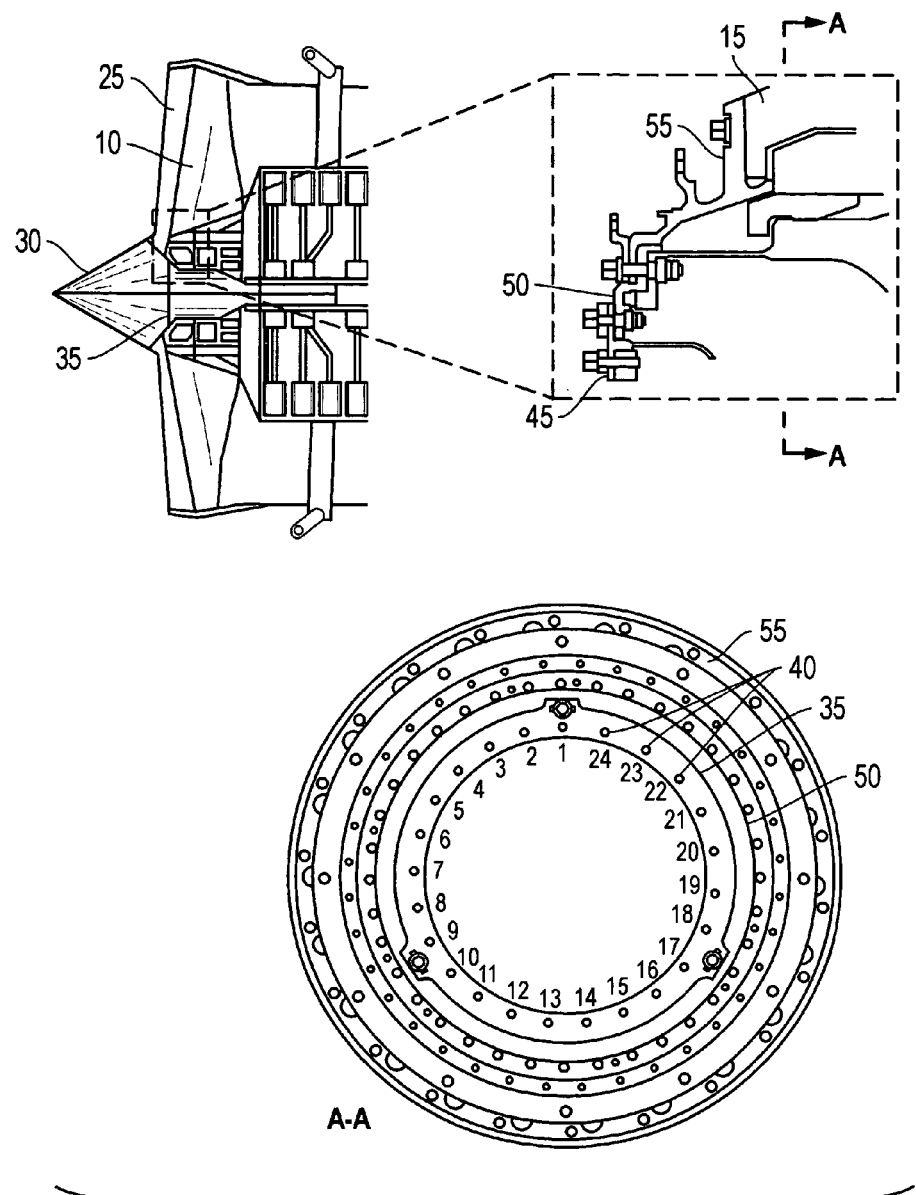
FIG. 1B depicts an enlarged view of the N1 low pressure section components of a Rolls-Royce RB211-535 engine, wherein is further depicted a view of the balance ring located in the N1 section depicted as utilized by the present invention.

In reference now to FIG. 1B, located behind the spinner 30, which is mounted on the inlet side 25 of the engine 5, is a balance ring 35. The balance ring 35 provides a plurality of balance weight locations, or commonly called bolt holes 40 that serve as the mounting apparatus for balancing weights 45 that have been selected as a result of derived solutions for effecting the balancing of engine vibrations caused by N1 fan blade 10 imbalances. Each bolt hole 40 is numbered in a counterclockwise direction beginning with bolt hole #1 and ending with bolt hole #24, according to the balance ring 35 utilized on the Rolls-Royce RB211-535E4B engine 5. The balance ring 35 is mounted by bolts to a support ring 50 that is in turn mounted to a locating ring 55. The locating ring 55 is ultimately mounted to the fan disc 15 described above.

The "3-shot plot" method for calculating a balance solution uses the applications of scalar geometry and triangulation to calculate the amount of correction weight and determine its necessary location, respectively. The mathematical principles utilized by the 3-shot plot method can be used to balance any rotating system, not just a jet turbofan engine.

The three shot plot requires a total of five engine 5 runs each conducted while the aircraft is on the ground and requires the use of a test weight of known mass mounted on the balance ring 35 to induce an imbalance that can be measured in order to observe the engine's reaction to that particular imbalance. The test weight can be of any known mass, but the best results on the RB211-535 engine 5 are generally achieved when a test weight of fifty grams is used. The test weight will be moved around the balance ring 35 during the process to three different locations, each preferably one hundred twenty degrees apart from the location the weight was mounted during the previous engine run.

The first engine run of the five engine runs is accomplished without having the test weight installed. This run constitutes an initial vibration survey for the specific engine and is necessary to determine the maximum level of vibration and at what engine rpm the peak magnitude of vibration actually occurs. The remaining three engine runs will utilize the same test weight and will each be accomplished at the specific engine rpm determined in this step.

Figure 2A:
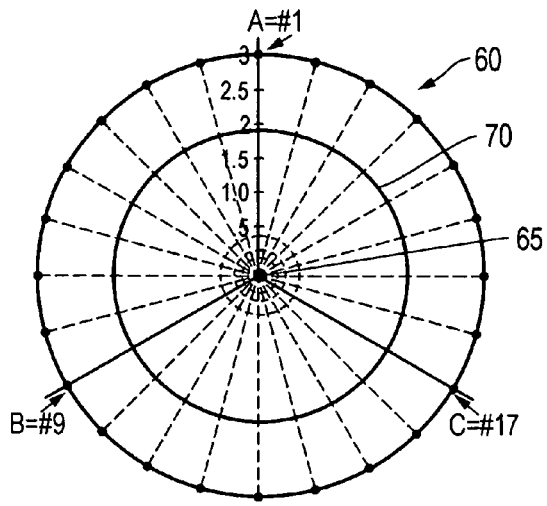
FIG. 2A-2E (Prior Art) depict a polar graph utilized in the well-known current 3-shot plot method for determining balance solutions, wherein various engine test runs are plotted by way of circle plots according to the prior art method.

As shown in FIG. 2A, using a typical polar coordinate chart 60 scaled to the level of vibration normally experienced by the system being balanced (approximately 4-5 units), the magnitude of vibration observed during this first engine run is plotted on the chart 60. However, the chart 60 in FIG. 2A is scaled from 0-3 units. A typical draftsman/engineer's compass is used to draw a complete first circle with radius equal to the magnitude of fan vibration observed on the Engine Indication and Crew Alert System (EICAS) (defined hereinbelow) during this initial engine run. The center of the first circle drawn lies on the center 65 of the chart 60. Later, as described below, a process of triangulation will be accomplished using this first circle as the foundation. Hereafter, the first circle is referred to as the 'base circle' 70.

In further reference to FIG. 2A, a polar graph having a base circle 70 of radius equivalent to the magnitude of fan vibration observed during the initial vibration survey example is shown wherein 2.0 units are plotted. Each circumferentially numbered point on the graph 60 represents a bolt hole 40 (as described above) on the balance ring 35 of the engine 5. Three separate, relatively equally spaced bolt hole locations (depicted in FIG. 2A as A#1, B#9, and C#17) are then selected on the balance ring 35. It is important that the bolt hole locations chosen (A#1, B#9, and C#17) in this step are the only bolt hole locations (e.g., A#1, B#9, and C#17) used during this the data collection portion of the process and that these bolt hole locations (e.g., A#1, B#9, and C#17) be approximately 120 degrees apart on the balance ring 35. The accuracy of the final calculation is heavily influenced by the bolt hole locations (e.g., A#1, B#9, and C#17) selected in this step.

Figure 2B:
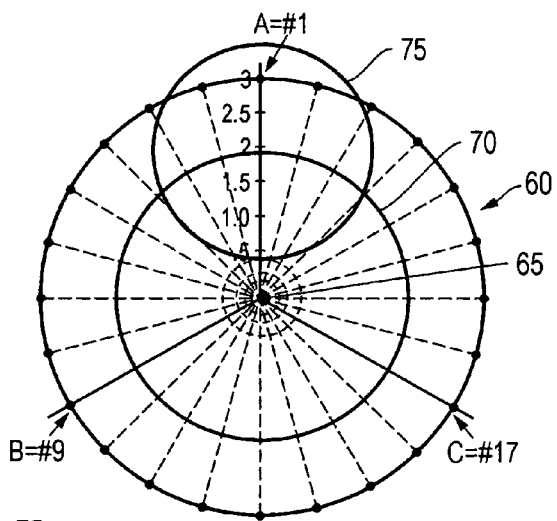

In reference to FIG. 2B, a test weight is then placed on bolt hole location identified as A#1 and the engine 5 is then accelerated to the RPM established as described above. The engine is then allowed to stabilize (approximately 5-10 seconds) and the magnitude of fan vibration is observed on EICAS (defined hereinbelow). As shown in FIG. 2B a second circle 75 indicating the $2^{nd}$ test run results having a radius equal to the level of vibration observed in this $2^{nd}$ test run is drawn on the polar graph 60 using the compass with the center of the compass located on the base circle 70 at bolt hole location A#1. It is important that the future 2nd, 3rd and 4th circles (representing the remaining data collecting engine runs) are drawn with their centers located on the base circle 70 at their respective locations and not the center of the graph 65. The plot is depicted with the results of the engine run having the test weight installed in bolt hole location A#1. In this example, the magnitude of the particular test's engine fan vibration was 1.5 units so a second circle 75 is drawn having a radius of 1.5 on the graph 60.

Figure 2C:
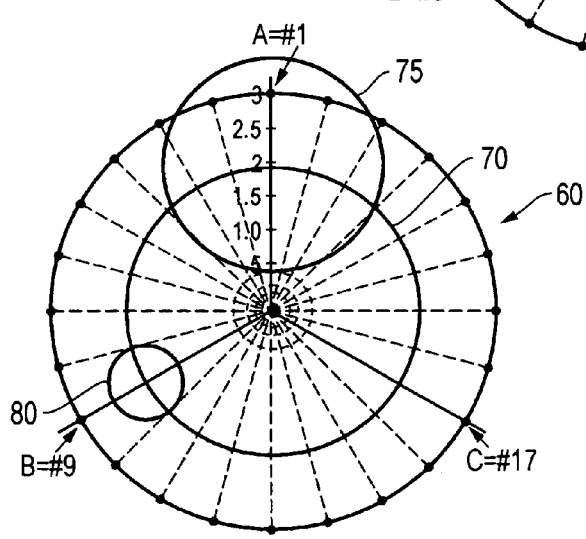

Next, the same trial weight is then moved to the second bolt hole B#9 selected and shown in FIG. 2C. The engine is again accelerated to the rpm established as described above. After allowing the engine to stabilize after approximately 5-10 seconds the magnitude of fan vibration is once again observed on the EICAS (defined below) as before. As shown in FIG. 2C, a third circle 80 with a radius equal to the level of vibration observed in this third engine test run drawn on the polar graph 60 using the compass with the center of the compass located on the base circle 70 along bolt hole location B#9 indicating the $3^{rd}$ engine test run. The plot is depicted with the results of the engine run having the test weight installed in bolt hole location B#9. With the weight in this bolt hole location B#9 the magnitude of fan vibration in this the third engine test run was measured at 0.5 units. Therefore, the third circle 80 is drawn having a radius of 0.5.

Figure 2D:
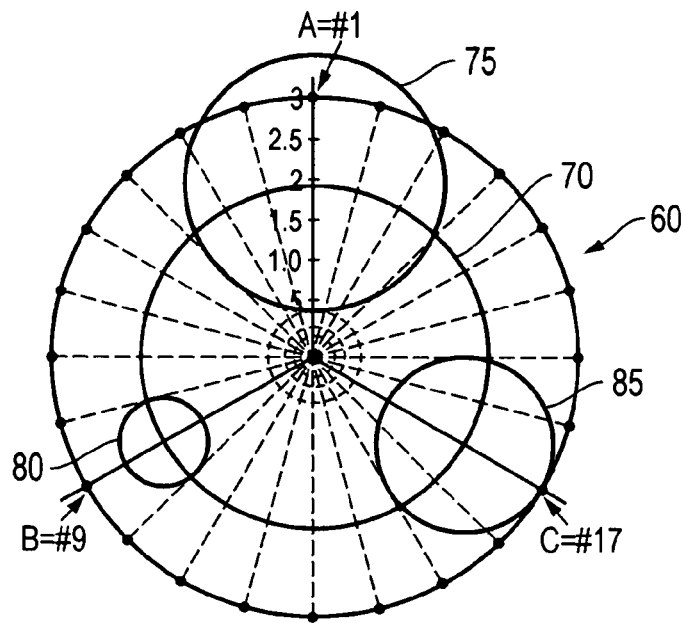

Next, as shown in FIG. 2D, the same trial weight is then moved to the third bolt hole location selected at C#17 and the engine is again accelerated to the rpm established as described above. Once again, the engine is allowed to stabilize (approximately 5-10 seconds) and the magnitude of fan vibration is observed on EICAS (defined hereinbelow). FIG. 2D depicts the representation of a fourth circle 85 with radius equal to the level of vibration observed in this the fourth engine test run. This fourth circle 85 is drawn on the polar graph 60, again using a compass, with the center of the compass located on the base circle 70 along bolt hole location C#17 as shown.

The plot is accomplished with the results of this $4^{th}$ engine test run using the test weight in location C#17 as shown in FIG. 2D. With the weight in bolt hole location C#17, the magnitude of fan vibration during this $4^{th}$ engine test run was measured as 1.0 units. Therefore, the fourth circle 85 has a radius of 1.0.

Finally, now having the entire data collection engine runs accomplished, a manual analysis is performed on the geometry of the data that has been plotted on the polar graph 60 as described above in FIGS. 2A-2D for each engine run. Specifically, as now shown in FIG. 2E, a final and fifth circle 90 is drawn such that the fifth circle 90 intersects the previous circles drawn on the graph 60. The center of the intersecting (or sometimes non-intersecting) circles corresponding to each engine run (runs 2-4) is located and is hereafter referred to as the "solution center" 95. The distance between the solution center 95 and the center of the base circle 70 is measured and recorded as a "trim radius" 100. The location of the solution center 95 also allows one to determine the bolt hole position location of where the balance solution weight will be placed on the balance ring 35.

Figure 2E:
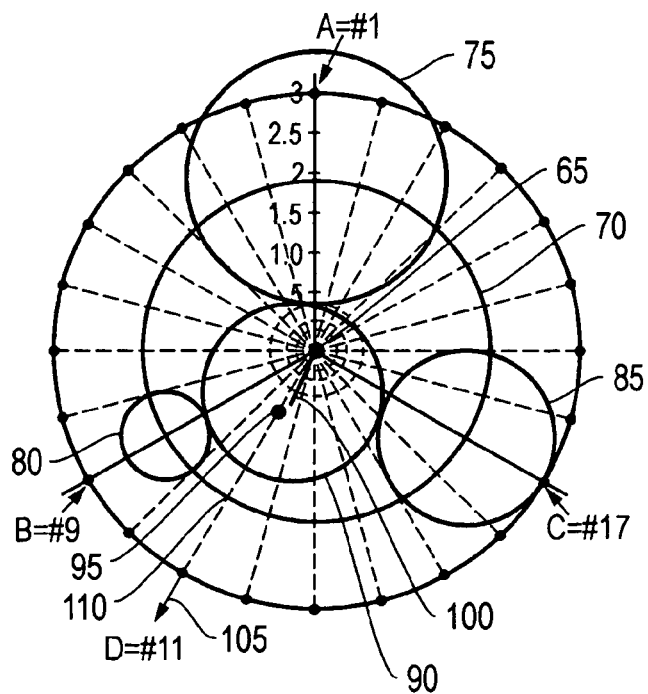

The location on the balance ring 35 where the solution weight is to be ultimately installed is determined by drawing an extension line 105 on the graph 60 connecting the center 65 of the base circle 70 and the solution center 95. The extension line 105 is drawn through the solution center 95 until it intersects 110 the base circle 70. The bolt hole location on the balance ring 35 that corresponds to this location on the polar chart 60 is the bolt hole location where the solution weight is finally installed. For example, as shown in FIG. 2E, the solution weight is installed on bolt hole location D#11 on the balance ring 35 as determined by where the extension line 105 intersects 110 the base circle 70 which lies along bolt hole D#11's position. With the bolt hole D#11 location of the solution weight now established as described above, all that remains is to calculate the mass of the solution weight.

Using the trim radius 100 determined above and the actual mass of the test weight used in the 2nd, 3rd and 4th ground engine runs, the following equation is used to manually calculate the actual mass/weight of the solution weight that must be procured or manufactured:

Solution weight=(base circle radius)×(test weight)/ (trim radius)

For example, in the solution worked through on the graphs of FIGS. 2A through 2E, the mass of the correction/trim weight will be:

(2.0 units)×(50.0 grams)/(0.7 units)=142.9 grams

Stock weights are purchased and trimmed using appropriate tooling components and procedures to obtain the precise weight calculated using the formula shown above. The solution weight is then installed on the bolt hole location identified. In this example, the 142.9 gram correction/trim weight is installed in bolt location D#11 on the balance ring 35 by using standard bolts and washers.

Once the solution weight is installed, a final engine run is conducted and constitutes another vibration survey to ensure that the balance solution has reduced the magnitude of fan vibration to an acceptable level. Similar to the previous monitoring of the vibration, the magnitude of vibration is monitored during the engine run by observing indications displayed on EICAS (defined hereinbelow). If the magnitude of fan vibration has been sufficiently reduced, no additional maintenance actions are necessary.

Utilizing the above described cumbersome prior art 3-shot plot method, one complete fan balance procedure conducted on only one engine, as described above, requires at a minimum of 3-4 mechanics (depending on the maintenance station) and approximately 6-8 hours. Such an operation results in an impact of approximately 18-32 man-hours and approximately 1,500 gallons of fuel totaling thousand of dollars. It is also important to highlight that this balancing data is limited to being acquired during ground tests only and not while in flight and never provides a jet engine mechanic or analyst a complete and literal picture of an engine's exact vibration performance during flight.

As a result, vibration and balance diagnostic techniques as described above can not be used by prior art engine vibration and analysis systems while in flight to monitor, record and transmit data for determining a real-time fan balance solution to enable real-time solutions and prompt reaction time for mechanics. Therefore, the following description of the novelty of the present invention eliminates the need of the prior art systems and methods described above for determining fan balance solutions.

Definitions:

For a complete understanding of the disclosure herein, it is advantageous to define several terms before describing the system and method of the present invention. Where the definition of a term departs from the commonly used meaning of the term, the inventors intend to utilize the definitions provided hereinbelow, unless specifically indicated.

It should be appreciated that the following terms, definitions and concepts are used throughout this application as relating to and including, but not limited to, aircraft, aircraft avionics, aircraft systems, aircraft engines and aircraft general maintenance and operations and the utilization of each with the system and method described herein.

It should also be further understood that the utilization of a specific term defined below to identify or address vendors, systems, components, software and/or hardware and the operation of the same as it relates to the scope and intent of the present invention is meant in no way to restrict or limit the use of other similarly accommodating vendors, systems, components, software, and/or hardware for carrying out the novelty of the system and method disclosed by the present invention.

For the purposes of the present invention, "rotor" is a term used to individually refer to the Low Pressure Compressor (LPC, fan or N1), Intermediate Pressure Compressor (IPC or N2) or High Pressure Compressor (HPC or N3) rotating assemblies. The N1 rotor or fan is most often referred to herein and comprises the assembly containing the fan blades 10, fan disc 15 and fan shaft 20 (shown in FIG. 1A) with incorporated phonic wheels for RPM and once-per-revolution signaling.

For the purposes of the present invention, "Digital Flight Data Acquisition Unit (DFDAU)" means a device that is a computer controlled unit that sequentially receives specific data from various airplane systems and sensors that conditions and formats data into a digital form and sends it to other aircraft computers and systems for recording and ultimate transmission to a ground station (defined below).

For the purposes of the present invention, "data link ground station" means an ARINC data-link station randomly positioned on the ground and comprising a communications network for receiving and transmitting information from enroute airborne aircraft.

For the purposes of the present invention, "central control ground station" means a central ARINC control station that compiles data acquired from a particular aircraft, packages it together, and transmits that data package via landline (electronic teletype format) to a plurality of recipients pre-approved by a customer. DS&S (defined below) is one of the pre-approved recipients utilized by the present invention.

For the purposes of the present invention, "Vibration Monitoring Unit (VMU) or Aircraft Vibration Monitor (AVM)" often times are used interchangeably but for the present invention AVM is preferred. In the Boeing 757, the AVM system employs two units to monitor engine vibrations for the left-hand and right-hand engines separately.

For the purposes of the present invention, "Airplane Condition Monitoring System (ACMS)" generally defines a system that is the overall performance monitoring system that comprises the DFDAU and the DFDR (defined below) components. The DFDAU is reprogrammed according to the present invention and is the only component in the overall system that is reprogrammed to specifically downlink the data necessary for the determining a balance solution according to the system and method of the present invention.

For the purposes of the present invention, "Digital Flight Data Recorder (DFDR)" means a flight data recorder wherein data is recorded in one second intervals and lasts for a rolling twenty-five hours of aircraft operation after which time the oldest data is overwritten. Depending on the aircraft's DFDR configuration, the data can either be stored on ¼-inch wide magnetic tape, or in solid state memory (similar to a home PC's hard drive). The magnetic tape must be removed from the system and copied into a compatible ground station computer/reader, but the solid state memory can be downloaded onto a flash memory card (similar to a 3.5-inch floppy disk) without having to remove the system from the aircraft. Many Boeing 757 aircraft's DFDRs are equipped with a solid state memory configuration which contains two separate channels (A and B) for downloading data.

For the purposes of the present invention, "Aircraft Communications Addressing and Reporting System (ACARS)" means a system that is a digital data-link system for enhancing and providing two-way communications between an aircraft and a ground station for both voice and electronic/ telemetry data. The signals are transmitted to and from the aircraft by way of ACARS via VHF. Data received by the DFDAU and programmed for transmission is sent to the ACARS unit by the DFDAU for downlinking to a linked ground station once the aircraft reaches stable cruise condition and if/when specifically requested by the pilot or ground station.

For the purposes of the present invention, "Aircraft Unit (ACU)" means the magnitude of the engine/rotor vibration level relative to the aircraft platform itself. This number is essentially 'unitless' since both the engine vibration magnitudes and aircraft vibration magnitudes are individually measured in inches-per-second (or "ips"). When compared relative to one another, the units cancel, leaving a vibration magnitude referred to as an 'aircraft unit'.

For the purposes of the present invention, "Engine Indication and Crew Alert System (EICAS)" means a system for providing real-time engine performance data necessary for the flight crew to perform normal flight procedures (e.g. rotor speeds, engine temperatures, fuel flow and vibration data, etc.). Should any monitored engine or aircraft parameter exceed its pre-determined operating range, EICAS alerts the flight crew with an appropriate warning. For the purposes of the present invention, the EICAS display for engine vibration and N1 rpm is observed to ensure that the balance solution provided by the automated calculations (described below) were sufficient to correct the engine's level of imbalance.

For the purposes of the present invention, "BroadBand (BB) Vibration" means the root-mean-square (RMS) value of the engine's magnitude of imbalance for all three rotors (N1, N2 and N3). This calculated vibration magnitude is the total engine vibration level being transmitted to the aircraft. If the BB vibration levels are exceeded during engine operation, EICAS will show the BB magnitude of vibration, as well as the level of vibration for the rotor (N1, N2 or N3) which is driving the BB magnitude exceeded.

For the purposes of the present invention, "Data Systems & Solutions (DS&S)" is used to describe a third party vendor utilized for engine condition/performance monitoring. However, this is not meant to limit the present invention from utilizing any vendor for such monitoring. DS&S analyzes data provided by the present invention relating to each engine's performance to look for performance problems that could result in anything from minor inefficiencies to major safety issues. DS&S calculates a fan balance solution utilizing software comprising balance equations after specific data is provided via the present invention comprising the phase angle of imbalance data, the N1 RPM and magnitude of N1 vibration ("ips") and uploads the solution onto a secure website per the present invention for use by engine technicians when installing the balance weight solution.

For the purposes of the present invention, "Channel "B" memory slot and card means a channel within the DFDR unit that is currently not used but is reprogrammed according to the present invention to collect any additional data that is not currently collected on Channel "A" of the DFDR.

Figure 3:
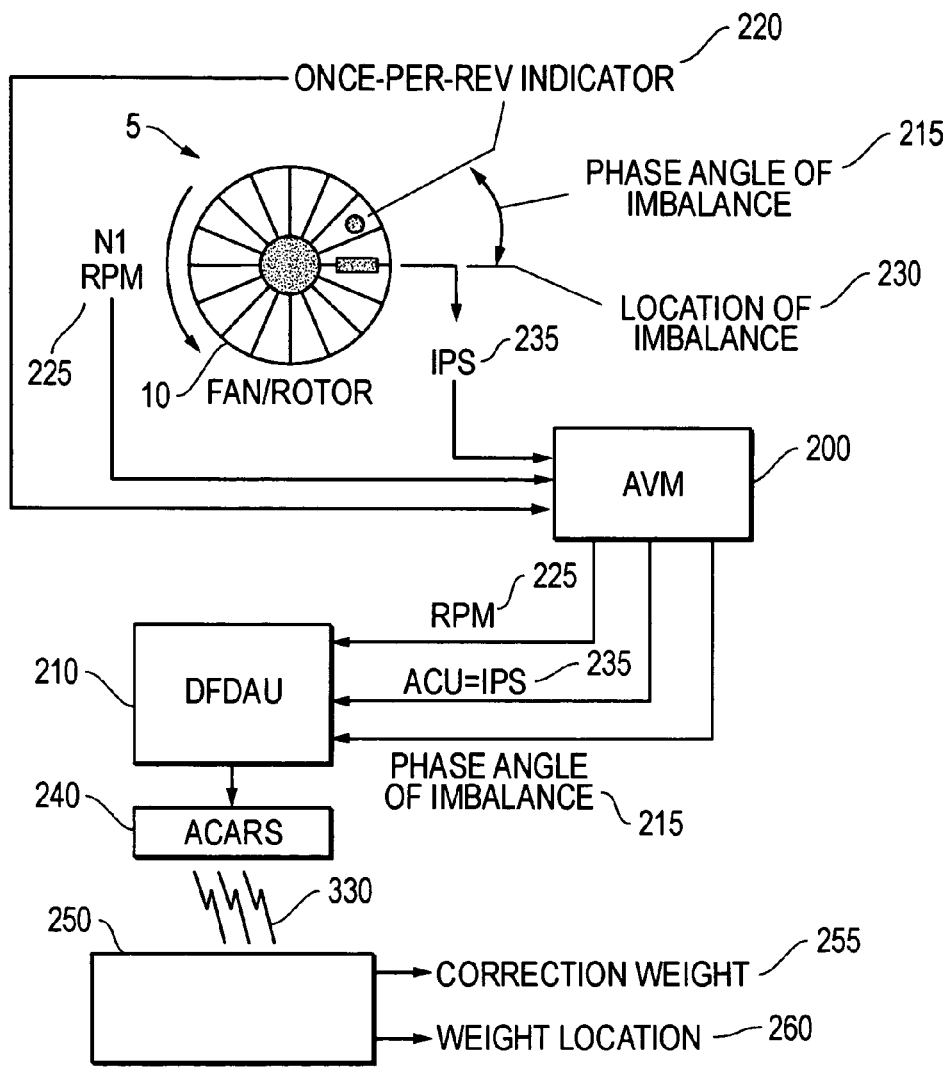
FIG. 3 depicts an overview of the features and components utilized with the system and method according to the present invention.
Figure 4:
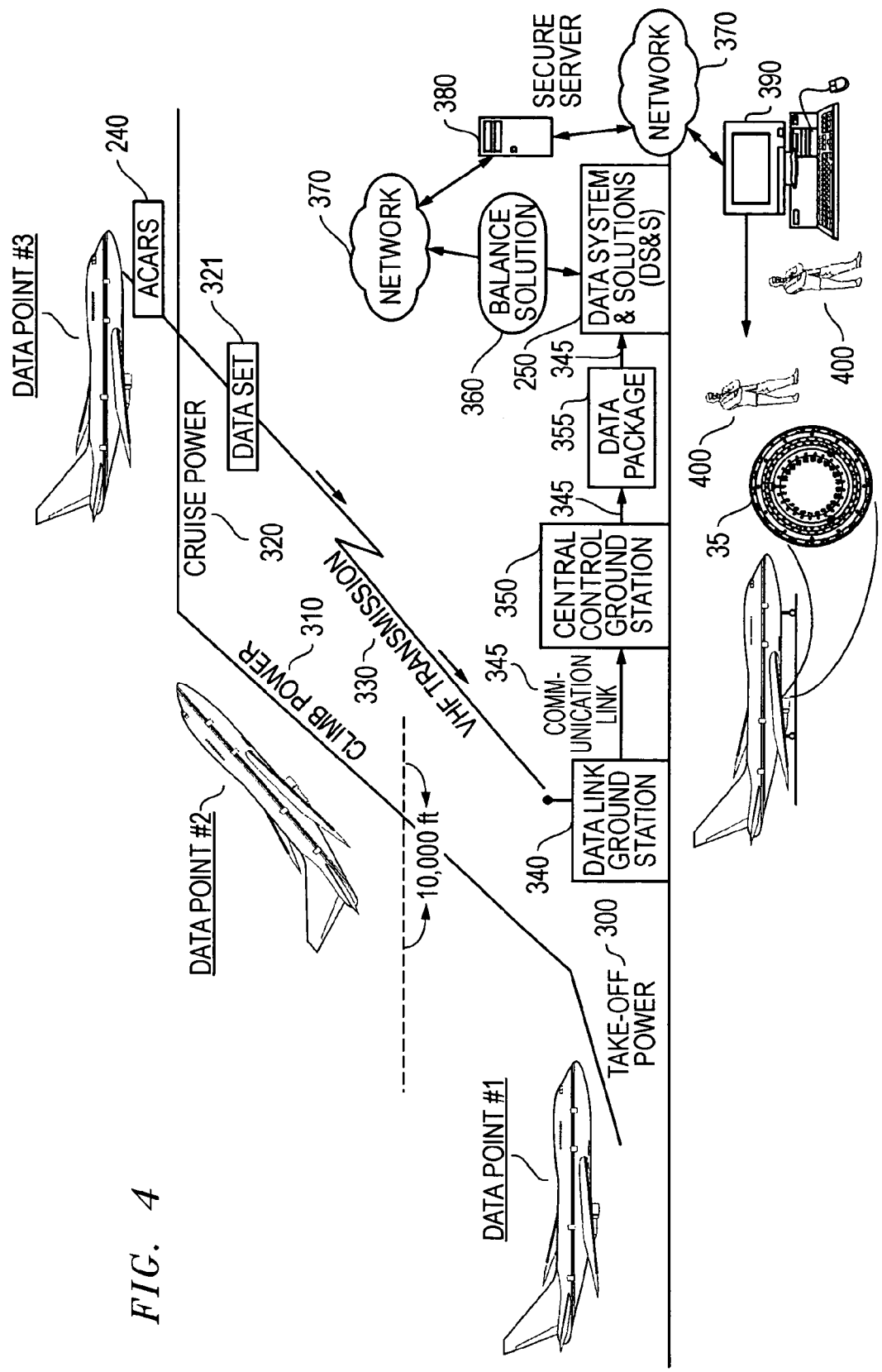
FIG. 4 depicts an overview of the method of collecting necessary vibration data at various power and flight profiles and transmission of the data to a plurality of ground stations for processing and calculation of N1 fan balance solutions and posting of the same to a secure server for controlled access by maintenance personnel according to the present invention.

With reference now to FIGS. 3 through 4, the system and method according to the present invention will be now be described. The system and method of the present invention significantly overcomes the encumbrances of the time, manpower, fuel and money presented by previous methods and especially by the prior art 3-shot plot method described above. A tremendous reduction in man hours, aircraft down time, industry costs and fuel costs are achieved through implementation and use of the system and method disclosed herein.

It will be understood by one skilled in the art of determining N1 fan balance solutions and performing balancing maintenance that the present invention can be utilized on a variety of aircraft and on a plurality of different type engines or mechanical devices that incorporate fans and/or turbines for producing power and or other forms of energy. However, the embodiments described herein will use non-limiting examples making specific reference to the Rolls-Royce jet engines (for example, the RB211-535) utilized on the Boeing 757 jet aircraft.

The system and method of the present invention utilizes in-place aircraft computers in such a way that when the software of the computers is modified, according to data set gathering matrix requirements discussed below, the computers monitor, collect, store, and transmit specific data sets once certain flight parameters and flight phases are reached. Such data sets are gathered from a plurality of engine and aircraft sensors located on the aircraft. As will be described in detail hereinbelow, the data sets comprise at least engine RPM, a vibration magnitude, and a calculated phase angle of imbalance, wherein the data sets are collected and stored during a minimum of three different power settings and flight profiles before finally transmitting the data from each setting and profile to a receiving station prior to the aircraft landing. The power settings and flight profiles comprise take-off, climb and cruise but are not limited thereto.

With specific reference to FIG. 3, an overview of the system of the present invention is depicted. As can be graphically seen in FIG. 3, the present invention employs a plurality of onboard aircraft systems, hardware, computers, indicators, and monitors to provide in-flight measured engine 5 vibration data for the calculation of fan balance solutions for overcoming fan imbalances. Specifically, the system monitors and collects information through various transducers and sensors located on the engine 5 and fuselage. For example, a vibration transducer is located on the engine 5 itself and the AVM which is located in the aircraft avionics bank, separated from the engine, each take individual readings from up to a three spool engine.

As can be seen in FIG. 3, the AVM 200, as defined above, on the Boeing 757 is employed to monitor engine 5 vibrations for the left-hand and right-hand engines 5 separately. The basic input signals into the AVM 200 include the engine rotor speeds and the total magnitude of the engine vibration. The rotor speed signals are created by magnetic induction coils mounted over a phonic wheel incorporated into each rotor's shaft assembly. The electronic signal produced by the magnetic coils is sent directly to the AVM 200 which converts that signal into an RPM 225 that is then compared to the maximum RPM for that rotor (i.e. max N1 rpm=6000 rpm, max N2 rpm=8000 rpm, max N3 rpm=10000 rpm) and displayed as a percent (e.g., an actual N1 rpm of 5000 rpm would be recorded and displayed as 83.3%). The electronic signal that is used to calculate the total magnitude of engine vibration "ips" 235 is created by a peizo-electric accelerometer, mounted to the outside of the engine 5. As the engine 5 "shakes", the materials inside the accelerometer are compressed, producing an electronic signal that is proportional to the level of vibration experienced by the engine 5. This signal is transmitted to the AVM 200, where it is filtered using rotor speed data to calculate the individual magnitudes of vibration for each of the three rotors (N1, N2 and N3).

Once each rotor's level of vibration is calculated, the AVM 200 also calculates a BB Vibration (defined above). The individual rotor (N1, N2 and N3) vibration levels, the BB vibration level and all three rotor speeds are then sent to the DFDAU 210 and to the Engine Indication and Crew Alert System (EICAS) (not shown). Within the DFDAU 210 are two channels, Channel A and Channel B. Currently Channel B is not used by many airlines, specifically America Airlines in the Boeing 757. Each channel can be programmed to acquire different data at different sample rates.

For example, Channel A records about 150 different parameters at a resolution of no less than one second. Channel A can be programmed it to ¼ of a second for resolution. In addition, similarly, Channel B can be programmed to record the same additional parameters at the same power settings that is transmitted via ACARS 240 to DS&S 250 (described hereinbelow) so that should that link 330 fail a hard line exists that can download and run other software to accomplish a balance solution.

The AVM 200 unit utilized with the system and method of the present invention comprises necessary equations programmed into its software to enable calculation of the N1 rotor's phase angle of imbalance 215. Each RB211-535 engine 5 employs a once-per-revolution indicator sensor 220 mounted near a second phonic wheel (not shown) located on the N1 rotor shaft 20. This second phonic wheel has a series of "teeth" (similar to very small gear teeth) lining the circumference of the wheel. However, there is one tooth that has been machined away, leaving a gap. As the fan rotor 10 rotates, the once-per-revolution indicator sensor 220 creates a constant electronic signal through magnetic induction (similar in principle to the speed probes), but as the "missing" tooth passes the sensor 220, a gap (or 0-input) in the electronic signal is produced. The AVM 200 takes the peak in the N1 rotor's 10 magnitude of vibration signal and correlates it to where it occurs in relation to the 0-signal during the fan's 10 rotation. This time difference is then used to calculate the location of the imbalance 230 within the fan 10, referred to as the phase angle of imbalance 215.

The present invention implements modifications to aircraft wiring for transmission of the once-per-revolution indications 220 to the AVM 200 to enable calculation of the phase angle of imbalance 215 as described. The phase angle of imbalance 215 in conjunction with the RPM 225 and ACU inches-per-second "ips" 235 (i.e., the magnitude of the engine/rotor vibration level as defined above in relation to "ACU") each collected at three separate times from three separate three power levels and three separate flight profiles is then transmitted from the AVM 200 to the DFDAU 210 for collection and to the EICAS (not shown) for monitoring.

In further reference to FIG. 3, after the DFDAU 210 receives the phase angle of imbalance 215, the RPM 225 and "ips" 235 from the AVM (collectively referred to as "data sets"), the DFDAU (comprising reprogrammed software in accordance with the present invention) transmits via ACARS 240 three data sets collected at three separate power levels and flight profiles as will be further described hereinbelow with reference to FIG. 4. The current DFDAU 210 programming logic already requires that the N1 RPM 225 and magnitude of N1 vibration levels ("ips") 235 be reported at take-off power and stable cruise power. After collecting the data sets described, the present invention then transmits the three data sets via ACARS 240 utilizing VHF frequencies to at least one ground station (as further detailed in FIG. 4), wherein a copy of that data is retrieved by DS&S 250 for calculation, utilizing balance equations provided by the engine manufacturer (e.g., Rolls-Royce as relating to the present invention), of a balance solution that provides a correction weight 255 and weight location 260 for placement on the balance ring 35 by maintenance as described herein. It should be understood that the DFDR 210 continues to collect second-by-second data for all three parameters throughout the flight.

With reference now to FIG. 4, as described above, the present invention discloses reprogramming of the software of the DFDAU 210 for transmitting via ACARS 240 the phase angle of imbalance 215 data along with accompanying information for N1 RPM 225 and the magnitude of N1 vibration "ips" 235 for eventual calculation of N1 fan balance solutions. The software of the present invention requires that for such transmission of data, three data point sets must be collected when the aircraft has reached the power levels shown below while at the specified flight profile segments shown in FIG. 4. The data collected at these three different power levels ensures that the resulting balance solution provides the best possible balance at each of the power regimes the engine will be operating.

Data point #1=take-off power 300 after power remains stable for 10 seconds;

Data point #2=climb power 310 after power remains stable for 30 seconds above an altitude of 10,000 feet; and Data point #3=cruise power 320 after power remains stable for more than 30 seconds.

After all three data point sets (1-3) 321 are collected, the aircraft's ACARS 240 then transmits via a first communication link, such as ARINC assigned VHF transmission frequencies 330 (primary freq. is 131.550 MHz), the three collected data sets 321 to a data-link ground station 340 local to the aircraft's particular flight path.

There exists a plurality of data-link ground stations 340 positioned at predetermined locations across the country that effectively comprise a regional network of such ground stations 340. The data point sets 321 are then transmitted from the data-link ground station, via a second communication link 90 such as landlines (electronic teletype format), or other communication methods, to a central control ground station 350. The central control station 350 then compiles all the data acquired from a particular aircraft (e.g., if more than one data set is transmitted to a variety of different stations), packages it together and transmits a data package 355 via a similar communications link 345 landline (electronic teletype format) to a plurality of recipients pre-approved by a specific customer (e.g., American Airlines). DS&S 250 is one of the pre-approved recipients that American Airlines, for example, requests that the central control ground station 350 provide Boeing 757 data to. It must be understood, however, that DS&S 250 is used herein for description and enablement of the present invention and the disclosure herein does not limit such recipients only to DS&S 250 for determining balance solutions 360 utilizing the system and method described herein.

DS&S 250, thereafter upon receipt of the data package 355 from the central control ground station 350, converts it into a format that is compatible with its systems for calculating a balance solution 360. DS&S 250, or similar function, then calculates a fan balance solution 360 and posts the solution via a network 370 (e.g., the Internet or other similar networks) to a secure server 380 which can be accessed via the network 370 by way of a microprocessor (e.g., PDA, desktop computers, laptops or other similar microprocessors) by maintenance technicians 400 or other personnel having protected access to the secure server 380.

Finally, the maintenance technician 400 is provided two pieces of balance solution 360 information via DS&S 250 required to repair the imbalance. This balance solution 360 information comprises a solution weight and location for installation (i.e., specific bolt hole location 40) on the balance ring 35. The one-shot plot solution described by the present invention requires only a single on ground engine balance validation run following installation of the solution weight and utilizes the EICAS during the engine balance validation run for providing real-time engine balance performance verification data. If a monitored engine's vibration exceeds acceptable ranges, the EICAS will alert the flight crew or maintenance personnel.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired.

It is therefore, contemplated that the claims will cover any such modifications or embodiments that fall within the true scope of the invention.

What is claimed is:

1. A method for providing and calculating fan vibration balance solutions for balancing a rotor in a turbine engine, the method comprising:
   receiving electronic engine vibration input signals, wherein the electronic engine vibration input signals are in monitor communication with a first microprocessor;
   receiving the electronic engine vibration input signals via the first microprocessor, wherein the first microprocessor is programmably configured to calculate and forward engine fan vibration data comprising at least a phase angle of imbalance to a second microprocessor;
   acquiring via a second microprocessor the engine fan vibration data forwarded by the first microprocessor, wherein the second microprocessor digitally formats, records and transmits the engine vibration data;
   receiving the transmitted engine vibration data at a plurality of ground stations for processing and calculation of the engine fan vibration balance solution; and
   uploading the engine fan balance solution onto a secure server via a network to enable real-time implementation of the engine fan balance solution for an imbalanced turbine engine.

2. The method of claim 1 wherein the input signals are received by vibration data monitoring devices comprises a plurality of transducers and piezo-electric devices disposed in signal communication with the engine and its components.

3. The method of claim 2 wherein the piezo-electric device comprises an accelerometer mounted to a portion of the engine, wherein a signal produced by the accelerometer is transmitted to the first microprocessor.

4. The method of claim 2 wherein the AVM calculates the magnitude of vibration in the rotors of the engine.

5. The method of claim 4 wherein the AVM further calculates a broadband magnitude of vibration.

6. The method of claim 5 wherein the calculated magnitude of vibration and broadband magnitude of vibration is forwarded to the DFDAU for digital processing thereof.

7. The method of claim 6 wherein the DFDAU is digitally programmed to acquire and transmit data comprising a phase angle of imbalance for each engine, N1 RPM, and the magnitude of N1 vibration.

8. The method of claim 7 wherein the data acquired and transmitted comprises an engine vibration data point set, wherein the data point set was collected during at least three different power settings while in at least three different phases of flight, the data point set comprising:
   a first data point including a take-off power setting after power remains stable for a predetermined period of time;
   a second data point including a climb power setting after power remains stable for a predetermined period of time and above a predetermined altitude; and,
   a third data point including a cruise power setting after power remains stable for a predetermined period of time.

9. The method as in claim 8 wherein the first data point is collected after a predetermined period of 10 seconds.

10. The method as in claim 9 wherein the second data point is collected after a predetermined period of 30 seconds and above a predetermined altitude of 10,000 feet.

11. The method as in claim 10 wherein the third data point is collected after a predetermined period of time of more than 30 seconds.

12. The method of claim 1 wherein the first microprocessor is an aircraft vibration monitor (AVM).

13. The method of claim 1 wherein the plurality of stations comprise a data link ground station, a central control ground station and a station for proving calculation of a balance solution utilizing the transmitted data, wherein the ground stations are in communication via a communication link.

14. The method of claim 13 wherein the central control ground station compiles the data, packages it together and forwards via the communication link to at least one balance solution calculating station.

15. The method of claim 14 wherein the calculated balance solution is posted via a network via at least the balance solution calculating station to a secure server for access by maintenance and industry personnel having protected access thereto.

16. The method of claim 15 wherein the calculated balance solution comprises the correction weight and location for installation of the correction weight on a balance ring of the turbine engine.

17. The method of claim 1 wherein the second microprocessor is a digital flight data acquisition unit (DFDAU).

18. The method of claim 1 wherein an AVM is utilized for each engine in a multi engine aircraft.

19. The method of claim 8 wherein the data point set is not transmitted until after collecting the third data point.

20. The method of claim 19 wherein data comprising the phase angle of imbalance, N1 RPM, magnitude of N1 vibration are transmitted together with the data point set.

21. The method of claim 20 wherein the transmission of the data is accomplished via an aircraft communications addressing and reporting system (ACARS) utilizing VHF frequencies.

* * * * *